United States Patent
Sano

(10) Patent No.: US 6,726,758 B2
(45) Date of Patent: Apr. 27, 2004

(54) BLACK INK SET AND RECORDING METHOD USING THE SAME

(75) Inventor: Tsuyoshi Sano, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 138 days.

(21) Appl. No.: 10/164,357

(22) Filed: Jun. 6, 2002

(65) Prior Publication Data

US 2003/0056687 A1 Mar. 27, 2003

(30) Foreign Application Priority Data

Jun. 7, 2001 (JP) ........................... 2001-172274

(51) Int. Cl.$^7$ .................. C09D 11/02; B41J 2/01
(52) U.S. Cl. ............. 106/31.6; 106/31.9; 347/100
(58) Field of Search ............. 106/31.6, 31.9; 347/100

(56) References Cited

U.S. PATENT DOCUMENTS

| | | | | |
|---|---|---|---|---|
| 6,342,096 B1 | * | 1/2002 | Kurabayashi | 106/31.27 |
| 6,478,862 B1 | * | 11/2002 | Elwakil | 106/31.6 |
| 2002/0038613 A1 | * | 4/2002 | Yatake | 106/31.6 |
| 2003/0226473 A1 | * | 12/2003 | Ishimoto | 106/31.6 |

FOREIGN PATENT DOCUMENTS

| | | |
|---|---|---|
| JP | 11228886 | 8/1999 |
| JP | 2000318293 | 11/2000 |
| JP | 2000345079 | 12/2000 |

OTHER PUBLICATIONS

Patent Abstract of Japan of JP 2000318293 Dated Nov. 21, 2000.

Patent Abstract of Japan of JP 2000345079 Dated Dec. 12, 2000.

Patent Abstract of Japan of JP 11228886 Dated Aug. 24, 1998.

* cited by examiner

Primary Examiner—Helene Klemanski
(74) Attorney, Agent, or Firm—Ladas & Parry

(57) ABSTRACT

Disclosed is a black ink set comprising a plurality of black ink compositions, wherein the plurality of black ink compositions each comprise carbon black, a magenta pigment, and a cyan pigment as colorants, and the plurality of black ink compositions are different from each other in content of carbon black, and the content of the magenta pigment and the content of the cyan pigment are such that all the plurality of black ink compositions have a chroma C* value of not more than 3. This ink set can realize black images possessing excellent gradation.

16 Claims, No Drawings

BLACK INK SET AND RECORDING METHOD USING THE SAME

BACKGROUND OF THE INVENTION

1. Field of the Invention

The present invention relates to a black ink set comprising a plurality of black ink compositions.

2. Background Art

Achromatic color images, in which the gradation changes from black to gray and from gray to white, can be realized by printing by using a plurality of black ink compositions with different black colorant concentrations.

When black images printed by black ink compositions having a very low carbon black concentration are carefully visually inspected, slightly yellowish black is observed. Although genuine black is achromatic ($a^*=0$, $b^*=0$), the printed black is deviated from the achromatic color. It has been pointed out that this phenomenon can be reduced to a considerable extent by increasing the amount of carbon black added while the phenomenon becomes more significant with reducing the amount of the carbon black added.

In order to prevent this phenomenon, Japanese Patent Laid-Open No. 318293/2000 proposes a recording method, wherein, for enhancing the reproduction of black in prints, black is printed, on a recording medium, using a combination of a first black ink with a second black ink having higher black density than the first black ink.

According to experiments conducted by the present inventors, however, when achromatic color images, in which the gradation changes from black to gray and from gray to white, are printed by using a plurality of black ink compositions with different carbon black contents, a light yellow image is found at the boundary between printed colors. For this reason, the present inventors have arrived at a conclusion that there is room for further improvement in reproduction of achromatic color images, particularly gray images.

SUMMARY OF THE INVENTION

The present inventors have now found that an ink set comprising a plurality of black ink compositions, which are different from each other in content of carbon black and contain a magenta pigment and a cyan pigment added in respective amounts such that all the plurality of black ink compositions have specific chroma $C^*$ values, can improve the reproduction of achromatic color and consequently can realize good printed images.

Accordingly, it is an object of the present invention to provide a black ink set having excellent reproduction of achromatic color by preventing the formation of a light yellow image at the boundary between colors in an achromatic color image.

According to one aspect of the present invention, there is provided a black ink set comprising a plurality of black ink compositions, wherein the plurality of black ink compositions each comprise carbon black, a magenta pigment, and a cyan pigment as colorants, and the plurality of black ink compositions are different from each other in content of carbon black, and the content of the magenta pigment and the content of the cyan pigment are such that all the plurality of black ink compositions have a chroma $C^*$ value of not more than 3.

DETAILED DESCRIPTION OF THE INVENTION

Black Ink Set

In the black ink set according to the present invention, black ink compositions constituting the black ink set each comprise carbon black, a magenta pigment, and a cyan pigment as colorants.

Further, the plurality of black ink compositions are different from each other in content of carbon black, and the content of the magenta pigment and the content of the cyan pigment are such that all the plurality of black ink compositions have specific chroma $C^*$ values.

Images yielded by the ink set according to the present invention have good reproduction of achromatic color. For example, when the ink set according to the present invention is utilized in prints of black-and-white image specifications where resolution of prints is required (for example, electron photomicrographs and X-ray diffraction images), boundary between colors in the print and a gradational change in achromatic color can be sharply reproduced. According to a preferred embodiment of the present invention, the ink set according to the present invention prefers using a combination of a plurality of ink compositions, i.e., an ink composition having a higher carbon black concentration with an ink composition having a lower carbon black concentration. The ink composition having a higher carbon black concentration can provide sharp shadow in black images, while the ink composition having a lower carbon black concentration can realize black images (particularly highlight black images) having excellent graininess on such a level that dots are not visible. As a result, reproduction and image quality of achromatic color images can be further improved.

1) Chroma $C^*$ Value

In the present invention, the plurality of black ink compositions are prepared so that all the plurality of black ink compositions have specific chroma $C^*$ values. More specifically, the black ink compositions are prepared so that the chroma $C^*$ value is preferably not more than 3, more preferably 0 (zero). To this end, the content of the magenta pigment and the content of the cyan pigment based on the content of carbon black in the black ink composition are properly regulated.

The content of carbon black is in the range of 0.01 to 10% by weight, preferably in the range of 0.1 to 8% by weight, based on the total amount of the black ink composition. According to a preferred embodiment of the present invention, the black ink set comprises a combination of a black ink composition having a carbon black content of not less than 1.0% by weight based on the total amount of the black ink composition with a black ink composition having a carbon black content of less than 1.0% by weight based on the total amount of the black ink composition.

The content of the magenta pigment is in the range of more than 0% by weight to not more than 5% by weight, preferably in the range of more than 0% by weight to not more than 3% by weight, based on the total amount of the black ink composition. The content of the cyan pigment is in the range of more than 0% by weight to not more than 5% by weight, preferably in the range of more than 0% by weight to not more than 3% by weight, based on the total amount of the black ink composition.

In the present invention, the carbon black, the magenta pigment, and the cyan pigment are contained in the above-defined respective ranges so that all the plurality of black ink compositions have desired specific chroma $C^*$ values.

2) K Value

According to a preferred embodiment of the present invention, the ink set satisfies a requirement that, in any of all combinations of two black ink compositions of the plurality of black ink compositions, the K value defined by the following equation of the black ink composition having a higher carbon black pigment content is smaller than the K value of the other black ink composition:

$$K = \frac{M + C}{Bk}$$

wherein

Bk represents the content of the carbon black based on the total amount of the black ink composition;

M represents the content of the magenta pigment based on the total amount of the black ink composition; and C represents the content of the cyan pigment based on the total amount of the black ink composition.

Here, the K value is in the range of approximately 0 to 10, preferably approximately 0 to 5.

3) Pigment

In the black ink composition according to the present invention, carbon black, a magenta pigment, and a cyan pigment are used as colorants.

These pigments are not particularly limited, and any of inorganic and organic pigments may be used. Examples of inorganic pigments include, in addition to titanium oxide and iron oxide, carbon blacks produced by known processes, such as contact, furnace, and thermal processes. Examples of organic pigments include: azo pigments including azo lake, insoluble azo pigment, condensed azo pigment, and chelate azo pigment; polycyclic pigments, for example, phthalocyanine, perylene, perinone, anthraquinone, quinacridone, dioxazine, thioindigo, isoindolinone, and quinophthalone pigments; dye chelates, for example, basic dye chelates and acid dye chelates; nitro pigments; nitroso pigments; and aniline black.

Specific examples of carbon blacks include: carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4 A, and Special Black 4.

Specific examples of magenta pigments include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, and C.I. Pigment Red 202.

Specific examples of cyan pigments include C.I. Pigment Blue 1, C.I. Pigment Blue 2, C.I. Pigment Blue 3, C.I. Pigment Blue 15:3, C.I. Pigment Blue 15:4, C.I. Pigment Blue 16, C.I. Pigment Blue 22, C.I. Pigment Blue 60, C.I. Vat Blue 4, and C.I. Vat Blue 60.

The particle diameter of these pigments is preferably not more than 0.3 μm, more preferably not more than 0.2 μm.

4) Dispersant

According to a preferred embodiment of the present invention, the pigment as the colorant is added, to the black ink composition, as a pigment dispersion prepared by dispersing the pigment in a solvent with the aid of a dispersant. Preferred dispersants may be those commonly used in the preparation of conventional pigment dispersions, for example, polymeric dispersants and surfactants.

Examples of preferred polymeric dispersants include naturally occurring polymeric compounds, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxyethylcellulose.

Examples of additional preferred polymeric dispersants include synthetic polymers, and specific examples thereof include: polyvinyl alcohols; polyvinyl pyrrolidones; acrylic resins, such as polyacrylic acid, acrylic acid-acrylonitrile copolymer, potassium acrylate-acrylonitrile copolymer, vinyl acetate-acrylic ester copolymer, and acrylic acid-alkyl acrylate copolymer; styrene-acrylic acid resins, such as styrene-acrylic acid copolymer, styrene-methacrylic acid copolymer, styrene-methacrylic acid-alkyl acrylate copolymer, styrene-α-methylstyrene-acrylic acid copolymer, and styrene-α-methylstyrene-acrylic acid-alkyl acrylate copolymer; styrene-maleic acid copolymer; styrene-maleic anhydride copolymer; vinylnaphthalene-acrylic acid copolymer; vinylnaphthalene-maleic acid copolymer; vinyl acetate copolymers, such as vinyl acetate-ethylene copolymer, vinyl acetate-fatty acid vinylethylene copolymer, vinyl acetate-maleic ester copolymer, vinyl acetate-crotonic acid copolymer, and vinyl acetate-acrylic acid copolymer; and salts of the above polymers. Among them, a copolymer of a monomer having a hydrophobic group with a monomer having a hydrophilic group and a polymer of a monomer having both a hydrophobic group and a hydrophilic group in its molecular structure are particularly preferred. Examples of the salt referred to above include salts, for example, with diethylamine, ammonia, ethylamine, triethylamine, propylamine, isopropylamine, dipropylamine, butylamine, isobutylamine, triethanolamine, diethanolamine, aminomethyl propanol, or morpholine. For these copolymers, the weight average molecular weight is preferably about 3,000 to 30,000, more preferably about 5,000 to 15,000.

According to a preferred embodiment of the present invention, acrylic acid-based water-soluble resins are preferred as the polymeric dispersant. In the present invention, the acrylic acid-based water-soluble resin is a resin comprising acrylic acid as a component, preferably a resin composed mainly of acrylic acid.

Specific examples of preferred acrylic acid-based water-soluble resins usable in the present invention include acrylic acid copolymers, methacrylic acid copolymers, acrylic acid-maleic acid copolymers, acrylic acid-methacrylic acid copolymers, acrylic acid-methacrylic acid-ethyl acrylate copolymers, acrylic acid-methacrylic acid-acrylonitrile copolymers, acrylic acid-n-butyl methacrylate copolymers, acrylic acid-methyl methacrylate copolymers, alkyl acrylate polymers, alkyl acrylate-acrylamide copolymers, alkyl acrylate-acrylic acid copolymers, alkyl acrylate-acrylic acid-alkylacrylamide copolymers, alkyl acrylate-acrylic acid-itaconic acid copolymers, alkyl acrylate-acrylic acid-alkyl itaconate copolymers, alkyl acrylate-acrylic acid-3- butene-2,3-tricarboxylic acid copolymers, alkyl acrylate-hydroxyalkyl acrylate copolymers, alkyl acrylate-itaconic acid copolymers, alkyl acrylate-ethylene glycol dimethacrylate copolymers, alkyl acrylate-vinyl chloroacetate copolymers, alkyl acrylate-diacetoneacrylamide copolymers, alkyl acrylate-divinylbenzene copolymers, alkyl acrylate-vinylpyridine copolymers, alkyl acrylate-alkyl maleate copolymers, alkyl acrylate-methacrylic acid copolymers, alkyl acrylate-methacrylic acid copolymers, alkyl acrylate-methacrylic acid-diallyl phthalate copolymers, ethyl acrylate-methyl methacrylate-dimethylaminoethyl methacrylate copolymers, ethyl acrylate-glycidyl methacrylate-acrylamide-styrene copolymers, octyl acrylate-methyl methacrylate-triphenyl itaconate copolymers, octyl acrylate-methyl methacrylate-triphenyl methacrylate copolymers, octyl acrylate-methyl methacrylate-triphenyl maleate copolymer, tribromophenyl acrylate polymers, tribromophenyl acrylate-chlorostyrene copolymers, and salts of these polymers, for example, lithium, sodium, potassium, calcium, magnesium, aluminum, and other metal salts. One or at least two resins selected from the above resins may be used. These resins may be produced by a method commonly used in the art. Alternatively, commercially available resins may be used. These resins are not limited to the form of copolymerization, and may be, for example, a block copolymer, a graft copolymer, a random copolymer, or a mixture of these (co)polymers.

Examples of preferred surfactants as the dispersant include: anionic surfactants, such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants, such as fatty acid amine salts, quaternary ammonium salts, sulfonium salts, and phosphoniums; and nonionic surfactants, such as polyoxyethylene alkyl ethers, polyoxyethylene alkyl esters, sorbitan alkyl esters, and polyoxyethylene sorbitan alkyl esters. A person having ordinary skill in the art would appreciate that these surfactants, when added to the ink composition, function also as a surfactant.

The content of the dispersant is preferably about 0.01 to 10% by weight, more preferably about 0.05 to 5% by weight, based on the total weight of the black ink composition.

5) Water, Water-Soluble Organic Solvent

According to a preferred embodiment of the present invention, the black ink compositions comprise water and a water-soluble organic solvent. Water may be pure water obtained by ion exchange, ultrafiltration, reverse osmosis, distillation or the like, or ultrapure water.

The water-soluble organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred low-boiling organic solvents. The content of the low-boiling organic solvent is preferably in the range of about 1 to 30% by weight, more preferably in the range of about 2 to 10% by weight, based on the total weight of the black ink composition.

Further, according to a preferred embodiment of the present invention, the black ink composition further comprises a high-boiling organic solvent. Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethyelene glycol monomethyl ether, triethylene glycol monoethyl ether, and triethylene glycol monobutyl ether; 2-pyrrolidone and N-methyl-2-pyrrolidone; 1,3-dimethyl-2-imidazolidinone; and triethanolamine.

Among them, the utilization of water-soluble organic solvents having a boiling point of 180° C. or above is preferred. The use of water-soluble organic solvents having a boiling point of 180° C. or above can impart water retention and wetting properties to the ink composition. As a result, storage of the ink composition for a long period of time neither causes coagulation of pigment nor an increase in the viscosity of the ink composition. Thus, excellent storage stability can be realized. Further, an ink composition can be realized which, even when allowed to stand in an open state, that is, when allowed to stand in contact with air at room temperature, can maintain the fluidity and the redispersibility for a long period of time. In addition, when the ink composition, which contains the water-soluble organic solvents having a boiling point of 180° C., used in ink jet recording, the ink composition does not cause clogging of nozzles during printing or at the time of restarting after interruption of printing, thus offering high ejection stability.

Examples of water-soluble organic solvents having a boiling point of 180° C. or above include ethylene glycol (b.p.: 197° C.; the boiling point being hereinafter described within parentheses), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), N-methyl-2-pyrrolidone (202° C.), 1,3-dimethyl-2-imidazolidinone (257–260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). Among these water-soluble organic solvents, those having a boiling point of 200° C. or above are preferred. These water-soluble organic solvents may be used solely or as a mixture of two or more.

The content of the high-boiling organic solvent is preferably about 1 to 30% by weight, more preferably about 2 to 20% by weight, based on the total weight of the black ink composition.

6) Surfactant

According to a preferred embodiment of the present invention, the black ink compositions may further comprise a surfactant. Specific examples of surfactants include: anionic surfactants, such as sodium dodecylbenzenesulfonate, sodium laurylate, and ammonium salt of polyoxyethylene alkyl ether sulfates; nonionic surfactants, such as polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides; and amphoteric surfactants, such as N,N-dimethyl-N-alkyl-N-carboxymethylammonium betaine, N,N-dialkylaminoalkylenecarbonxylates, N,N,N-trialkyl-N-sulfoalkyleneammonium betaine, N,N-dialkyl-N,N-bispolyoxyethyleneammoniumsulfonic ester betaine, and 2-alkyl-1-carboxymethyl-1-hydroxyethylimidazolinium betaine. They may be used solely or in combination of two or more.

According to a more preferred embodiment of the present invention, the black ink compositions further comprise a glycol ether and/or an acetylene glycol surfactant.

Glycol ethers are those which are also usable as the above-described water-soluble organic solvent. Specific examples of glycol ethers usable herein include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether. They may be used solely or as a mixture of two or more.

In the present invention, preferably, the black ink compositions further comprise an acetylene glycol surfactant. The addition of the acetylene glycol surfactant can enhance the ability of the ink composition to penetrate recording media, and thus can be expected to realize the formation of prints having no significant feathering or bleeding on various recording media.

Specific examples of preferred acetylene glycol surfactants usable in the present invention include compounds represented by formula (I):

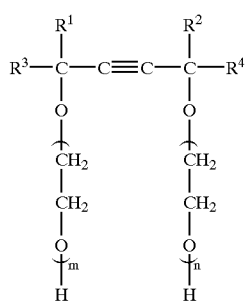

(I)

wherein
m+n is 0 to 50; and
$R^1$, $R^2$, $R^3$, and $R^4$ each independently represent an alkyl group, preferably an alkyl group having 6 or less carbon atoms.

Among the compounds represented by formula (I), particularly preferred compounds include, for example, 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactant represented by formula (I). Specific examples thereof include Surfynol 104, Surfynol 82, Surfynol 465, Surfynol 485, and Surfynol TG (all the above products being available from Air Products and Chemicals Inc.), and Olfine STG and Olfine E 1010 (tradenames of products available from Nissin Chemical Industry Co., Ltd.).

The content of the surfactant is preferably about 0.01 to 10% by weight, more preferably about 0.1 to 5% by weight, based on the total weight of the black ink composition.

7) Other Ingredients

According to a preferred embodiment of the present invention, the black ink compositions further comprise a tertiary amine, an alkali hydroxide, an alginic acid derivative, a saccharide, and a saccharide derivative. The addition of these ingredients can impart wetting properties, dispersion stability, and nozzle anti-clogging properties to the ink compositions.

Examples of tertiary amines include trimethylamine, triethylamine, triethanolamine, dimethylethanolamine, diethylethanolamine, triisopropanolamine, and butyldiethanolamine. They may be used solely or as a mixture of two or more. The content of the tertiary amine is preferably about 0.01 to 10% by weight, more preferably about 0.1 to 5% by weight, based on the total weight of the black ink composition.

Examples of alkali hydroxides include potassium hydroxide, sodium hydroxide, and lithium hydroxide, and the content of the alkali hydroxide is preferably about 0.01 to 5% by weight, more preferably about 0.05 to 3% by weight, based on the total weight of the black ink composition.

Examples of preferred alginic acid derivatives include alkali metal salts, such as sodium salt and potassium salt, of alginic acid, organic salts, such as triethanolamine salt, of alginic acid, and ammonium alginate. The content of the alginic acid derivative is preferably about 0.001 to 5% by weight, more preferably about 0.01 to 3% by weight, based on the total weight of the black ink composition.

Examples of saccharides include: monosaccharides; disaccharides; oligosaccharides including trisaccharides and tetrasaccharides; and polysaccharides, and preferred examples thereof include glucose, mannose, fructose, ribose, xylose, arabinose, galactose, aldonic acid, glucitol, sorbit, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbit. The content of the saccharide or the saccharide derivative is preferably about 0.1 to 20% by weight, more preferably about 1 to 10% by weight, based on the total weight of the black ink composition.

The ink compositions according to the present invention may further contain preservatives, pH adjustors, solubilizers, antioxidants, and chelating agents.

Examples of preservatives include sodium benzoate, pentachlorophenol sodium, 2-pyridinethiol-1-oxide sodium, sodium sorbate, sodium dehydroacetate, and 1,2-dibenzisothiazolin-3-one (Proxel CRL, Proxel BDN, Proxel GXL, Proxel XL-2, and Proxel TN, manufactured by ICI).

Examples of pH adjustors, solubilizers, or antioxidants include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxides, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanates, such as allophanate and methyl allophanate; biurets, such as biuret, dimethylbiuret, and tetramethylbiuret; and L-ascorbic acid and salts thereof. Chelating agents include ethylenediaminetetraacetic acid (EDTA).

Color Ink Set

In another embodiment of the present invention, there is provided a color ink set comprising a plurality of black ink compositions in the black ink set according to the present invention and other ink compositions. For the other ink compositions, colorants and other ingredients may be properly determined by taking printing methods into consideration.

In a preferred another embodiment of the present invention, there is provided a color ink set comprising a combination of the plurality of black ink compositions according to the present invention with a magenta ink composition, a cyan ink composition, or a yellow ink composition. In a more preferred embodiment of the present invention, there is provided a color ink set comprising a combination of the above color ink set with a light magenta ink composition, a light cyan ink composition, or a light yellow ink composition.

Pigments in the magenta ink composition and the cyan ink composition may be the same as those described above in connection with the black ink compositions according to the present invention. Pigments usable for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Further, additive ingredients, such as dispersants, water-soluble organic solvents, and surfactants, and the amounts thereof in the cyan ink composition, the magenta ink composition, and the yellow ink composition may be the same as those described above in connection with the black ink compositions according to the present invention.

Production of Ink Composition

The ink compositions according to the present invention may be prepared by dispersing and mixing the above ingredients together by means of a suitable method. A pigment, a dispersant, and water are mixed together by means of a dispergator, for example, a ball mill, a sand mill, an attritor, a roll mill, an agitator mill, a Henschel mixer, a colloid mill, an ultrasonic homogenizer, a jet mill, or an angmill, to prepare a homogeneous dispersion. Next, the remaining water, a water-soluble organic solvent, and the remaining ingredients such as a surfactant, are added to the dispersion, and the mixture is further stirred to prepare an ink solution. After thorough stirring, the ink solution is filtered to remove coarse particles and foreign matter causative of nozzle clogging to prepare a contemplated ink composition.

Ink Cartridge

When the ink composition according to the present invention is used in ink jet recording, the ink composition is reservoired in a container and is loaded into an ink jet recording apparatus. A specific example of the container is a single color or multicolor ink cartridge. In the ink cartridge, the ink is loaded and filled into an ink pack or the like. When a plurality of inks are present, these inks may be contained in respective ink packs or the like to constitute an ink cartridge.

The ink pack is in a cylindrical, elliptical, rectangular parallelepiped, square or other form. This form of ink pack may be formed of a synthetic resin film such as a polyethylene, polystyrene, polyvinyl chloride, acrylic resin, ion-exchange resin, alkyd resin, phenolic resin, urea resin, melamine resin, unsaturated polyethylene, or fluororesin film, or a metal film such as an aluminum film. This form of ink pack may be formed in a single layer using one of the above films, or alternatively may be formed in a single layer or multilayer using one or at least two of the above films.

Recording Method

The ink set according to the present invention may be used in image recording methods using ink compositions. Recording methods using the ink compositions include, for example, a recording method using writing utensils, such as pens, an ink jet recording method, screen printing, and other various printing methods. The present invention is particularly preferably used in an ink jet recording method wherein droplets of an ink composition are ejected and are deposited onto a recording medium to perform printing. In particular, the use of the ink jet recording method can realize printing on recording media using a proper combination of ink compositions constituting the ink set according to the present invention.

Printing on recording media using the black ink set according to the present invention can realize excellent color reproduction of achromatic color images, particularly gray images, and, as a result, good printed images can be produced.

EXAMPLES

The following examples further illustrate the present invention, but are not construed as limiting the scope of the present invention.

Preparation of Ink Compositions

Black ink compositions were prepared according to formulations indicated in Tables 1 and 2 below. The pigments and the dispersant were first mixed together, and the mixture was dispersed together with glass beads (diameter: 1.7 mm, amount: 1.5 times (by weight) larger than the mixture) for 2 hr in a sand mill (manufactured by Yasukawa Seisakusho). Thereafter, the glass beads were removed from the dispersions. The other additives were added to the dispersions, and the mixtures were stirred at room temperature for 20 min, followed by filtration through a 5 $\mu$m membrane filter to prepare ink compositions.

In Tables 1 and 2, "water-soluble resin" represents a styrene-acrylic acid copolymer (molecular weight 15000, acid value 100), "EDTA" represents ethylenediaminetetraacetic acid, and "Bk" represents black ink. Numerical values in the tables are in % by weight.

TABLE 1

|  | Bk 1 | Bk 2 | Bk 3 | Bk 4 | Bk 5 | Bk 6 |
|---|---|---|---|---|---|---|
| Pigment | | | | | | |
| Carbon black | 4 | 3 | 2 | 1.2 | 0.8 | 0.4 |
| C.I. Pigment Blue 15:3 | 0.2 | 0.3 | 0.4 | 0.5 | 0.4 | 0.7 |
| C.I. Pigment Red 122 | 0.2 | 0.4 | 0.5 | 0.4 | 0.4 | 0.6 |
| (K value) | (0.1) | (0.2) | (0.45) | (0.75) | (1.0) | (3.25) |
| Dispersant | 1.1 | 0.9 | 0.7 | 0.5 | 0.4 | 0.4 |
| Glycerin | 10 | 12 | 14 | 15 | 16 | 17 |
| Ethylene glycol | 5 | 5 | 6 | 5 | 6 | 7 |
| 2-Pyrrolidone | 2 | 2 | 2 | 2 | 2 | 2 |
| Triethylene glycol monobutyl ether | 7 | 7 | 7 | 7 | 7 | 7 |
| Surfynol 465 | 1 | 1 | 1 | 1 | 1 | 1 |
| EDTA | 0.02 | 0.02 | 0.02 | 0.02 | 0.02 | 0.02 |
| Pure water | | | Balance | | | |

TABLE 2

|  | Bk 11 | Bk 12 | Bk 13 | Bk 14 | Bk 15 | Bk 16 |
|---|---|---|---|---|---|---|
| Pigment | | | | | | |
| Carbon black | 4 | 3 | 2 | 1.2 | 0.8 | 0.4 |
| C.I. Pigment Blue 15:3 | 0.5 | 0.2 | 0.1 | 0.1 | 0.1 | 0.05 |
| C.I. Pigment Red 122 | 0.5 | 0.3 | 0.2 | 0.1 | 0.1 | 0.05 |
| (K value) | (0.25) | (0.17) | (0.15) | (0.83) | (0.25) | (0.25) |
| Dispersant | 1.1 | 0.9 | 0.7 | 0.5 | 0.4 | 0.4 |
| Glycerin | 10 | 12 | 14 | 15 | 16 | 17 |
| Ethylene glycol | 5 | 5 | 6 | 5 | 6 | 7 |
| 2-Pyrrolidone | 2 | 2 | 2 | 2 | 2 | 2 |
| Triethylene glycol monobutyl ether | 7 | 7 | 7 | 7 | 7 | 7 |
| Surfynol 465 | 1 | 1 | 1 | 1 | 1 | 1 |
| EDTA | 0.02 | 0.02 | 0.02 | 0.02 | 0.02 | 0.02 |
| Pure water | | | Balance | | | |

Ink Evaluation Tests

The black ink compositions thus prepared were loaded into a specialty ink cartridge for an ink jet printer PM-770C manufactured by Seiko Epson Corp. The specialty ink cartridge had six ink chambers. Black inks Bk 1 to Bk 6 were loaded respectively into the six ink chambers to constitute an ink set of "example". Further, black inks Bk 11 to Bk 16 were loaded respectively into the six ink chambers to constitute an ink set of "comparative example."

Evaluation Test 1: Reproduction of Black

Each ink composition in the above ink sets was output to print blotted images (duty=100%) ranging from deep gray images to light gray images. A specialty recording medium (gloss film manufactured by Seiko Epson Corp.) was used for printing. The output gray image pattern was measured with a spectrophotometer (GRETAG SPM, manufactured by GRETAG) to determine the coordinates of the L*a*b* color system of the color difference indication method specified in CIE (Commission International de l'Eclairage). In this case, the measurement was carried out under conditions of light source D50, provision of no light source filter, absolute white as reference white, and angle of visibility 2°. The chroma C* was determined by substituting the hue values of a* and b* for a* and b* in the following equation. The measured values of L*, a*, b*, and C* were as summarized in Table 3 below.

$$C^* = \sqrt{(a^*)^2 + (b^*)^2}$$

TABLE 3

|  |  | L* | a* | b* | C* |
|---|---|---|---|---|---|
| Ex. | Bk 1 | 6.59 | −1.02 | −1.53 | 1.83 |
|  | Bk 2 | 9.89 | 0.15 | −0.88 | 0.89 |
|  | Bk 3 | 13.23 | 0.38 | 0.29 | 0.48 |
|  | Bk 4 | 22.17 | 1.31 | 0.99 | 1.64 |
|  | Bk 5 | 34.51 | 2.10 | 2.08 | 2.96 |
|  | Bk 6 | 50.57 | 1.82 | 0.39 | 1.86 |
| Comp. Ex. | Bk 11 | 7.30 | −0.75 | −2.99 | 3.08 |
|  | Bk 12 | 10.11 | 0.81 | 1.35 | 1.57 |
|  | Bk 13 | 13.91 | 1.83 | 2.49 | 3.09 |
|  | Bk 14 | 23.91 | 2.83 | 5.79 | 6.44 |
|  | Bk 15 | 37.75 | 3.18 | 9.07 | 9.61 |
|  | Bk 16 | 55.78 | 7.78 | 15.93 | 17.7 |

Evaluation Test 2: Image Quality

Each ink composition in the ink set was output to print a black-and-white image of a woman. In this case, ISO/JIS-SCID high-definition color digital standard image data/Japanese Standards Association: name of file "n1.tif" was used as the image object of the woman. Shade portions of printed images and shadow portions of images such as hair of the person were visually evaluated.

As a result, in the image formed by the ink set of example, the light and shade of the hairline had texture. Further, no dot was seen in light-density output region (light image portion). Thus, an excellent black image could be reproduced. On the other hand, in the image formed by the ink set of comparative example, black close to achromatic color was realized in a deep black portion. In a light black portion, however, reddish and yellowish images were formed, and any gradational black image could not be reproduced.

What is claimed is:

1. A black ink set comprising a plurality of black ink compositions, wherein
   the plurality of black ink compositions each comprise carbon black, a magenta pigment, and a cyan pigment as colorants, and
   the plurality of black ink compositions are different from each other in content of carbon black, and the content of the magenta pigment and the content of the cyan pigment are such that all the plurality of black ink compositions have a chroma C* value of not more than 3.

2. The black ink set according to claim 1, wherein at least two black ink compositions out of the plurality of black ink compositions have a chroma C* value of 0 (zero).

3. The black ink set according to claim 1, wherein, in any of all combinations of two black ink compositions of the plurality of black ink compositions, the K value represented by the following equation of the black ink composition having a higher carbon black pigment content is smaller than the K value of the other black ink composition:

$$K = \frac{M + C}{Bk}$$

wherein
   Bk represents the content of the carbon black based on the total amount of the black ink composition;
   M represents the content of the magenta pigment based on the total amount of the black ink composition; and
   C represents the content of the cyan pigment based on the total amount of the black ink composition.

4. The black ink set according to claim 3, wherein the plurality of black inks have a K value falling within the range of 0 to 10.

5. The black ink set according to claim 1, wherein the content of the carbon black is 0.01 to 10% by weight based on the total amount of the black ink composition.

6. An ink cartridge comprising the black ink set according to claim 1 integrally housed therein.

7. A recording method comprising the step of depositing an ink composition in the black ink set according to claim 1 onto a recording medium to print a gray image on the recording medium.

8. A recording method comprising the steps of: ejecting droplets of the ink composition in the black ink set according to claim 1; and depositing the droplets onto a recording medium to print a gray image on the recording medium.

9. A print produced by the recording method according to claim 7.

10. A print produced by the recording method according to claim 8.

11. A color ink set comprising black ink compositions, a yellow ink composition, a magenta ink composition, or a cyan ink composition, wherein the black ink compositions each comprise carbon black, a magenta pigment, and a cyan pigment as colorants, and the plurality of black ink compositions are different from each other in content of carbon black, and the content of the magenta pigment and the content of the cyan pigment are such that all the plurality of black ink compositions have a chroma C* value of not more than 3.

12. The color ink set according to claim 11, wherein at least two black ink compositions out of the plurality of black ink compositions have a chroma C* value of 0 (zero).

13. The color ink set according to claim 11, wherein, in any of all combinations of two black ink compositions of the plurality of black ink compositions, the K value represented by the following equation of the black ink composition having a higher carbon black pigment content is smaller than the K value of the other black ink composition:

$$K = \frac{M + C}{Bk}$$

wherein

Bk represents the content of the carbon black based on the total amount of the black ink composition;

M represents the content of the magenta pigment based on the total amount of the black ink composition; and C represents the content of the cyan pigment based on the total amount of the black ink composition.

14. The color ink set according to claim 13, wherein the plurality of black inks have a K value falling within the range of 0 to 10.

15. The color ink set according to claim 11, wherein the content of the carbon black is 0.01 to 10% by weight based on the total amount of the black ink composition.

16. The color ink set according to claim 11, which further comprises a light yellow ink composition, a light magenta ink composition, or a light cyan ink composition.

* * * * *